United States Patent [19]

Mussinan et al.

[11] 4,335,002
[45] Jun. 15, 1982

[54] COMPOSITIONS OF MATTER CONTAINING CIS-3-HEXENAL

[75] Inventors: Cynthia J. Mussinan, Bricktown; Braja D. Mookherjee, Holmdel; Manfred H. Vock, Locust; Frederick L. Schmitt, Holmdel; Edward J. Granda, Englishtown; Joaquin F. Vinals, Red Bank, all of N.J.; Jacob Kiwala, Brooklyn, N.Y.

[73] Assignee: International Flavors & Fragrances Inc., New York, N.Y.

[21] Appl. No.: 169,678

[22] Filed: Jul. 17, 1980

Related U.S. Application Data

[62] Division of Ser. No. 85,707, Oct. 17, 1979, Pat. No. 4,241,098.

[51] Int. Cl.³ .................. A23L 1/226; A23L 2/26; A61K 7/46; C11B 9/00
[52] U.S. Cl. .................................. 252/1; 131/277; 131/278; 252/8.6; 252/8.9; 252/174.11; 252/522 R; 424/52; 424/69; 426/534; 568/421
[58] Field of Search ............... 252/1, 407, 522 R; 426/534; 568/421

[56] References Cited

U.S. PATENT DOCUMENTS

| | | | |
|---|---|---|---|
| 1,766,760 | 6/1930 | Morton | 252/1 X |
| 2,691,615 | 10/1954 | Turner et al. | 252/1 X |
| 3,093,681 | 6/1963 | Eichmann et al. | 252/522 R X |
| 4,069,260 | 1/1978 | Watson et al. | 252/522 R X |

OTHER PUBLICATIONS

Corey et al.: "Pyridinium Chlorochromate...", Tetrahedron Letters, No. 31, pp. 2647–2650, (1975), Pergamon Press, Great Britain.
Arctander: "Perfume and Flavor Chemicals", vol. I, 1969, Publ. by the Author, Montclair, N.J., Items No. 1598, 1599, 1604, 1617, 1620.
Kajiwara et al.: "Isolation of Z-3-Hexenal in Tea Leaves...", Agr. Biol. Chem., 39 (1), 243–247, (1975).

Primary Examiner—Richard D. Lovering
Attorney, Agent, or Firm—Arthur L. Liberman

[57] ABSTRACT

Described are cis-3-hexenyl derivatives having the generic structure:

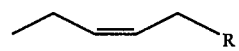

wherein R is one of the moieties:

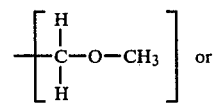

or

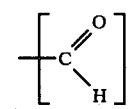

which are useful in foodstuffs, flavorings, fragrances, perfumed articles (e.g. anionic, cationic or nonionic detergents, dryer-added fabric softener articles and cosmetic powders) and smoking tobacco flavorings; processes for producing such cis-3-hexenyl derivatives and products produced according to such processes which include chemical compounds in addition to said cis-3-hexenyl derivatives.

1 Claim, 15 Drawing Figures

GLC PROFILE FOR EXAMPLE II

GLC PROFILE FOR EXAMPLE I

FIG.3
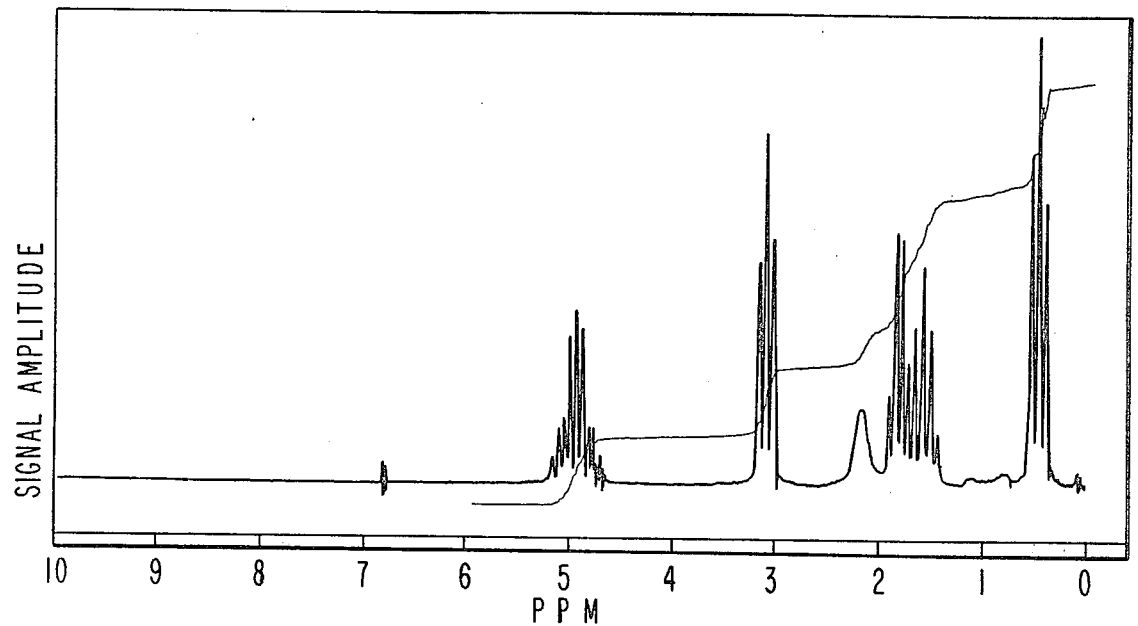
NMR SPECTRUM FOR EXAMPLE II.
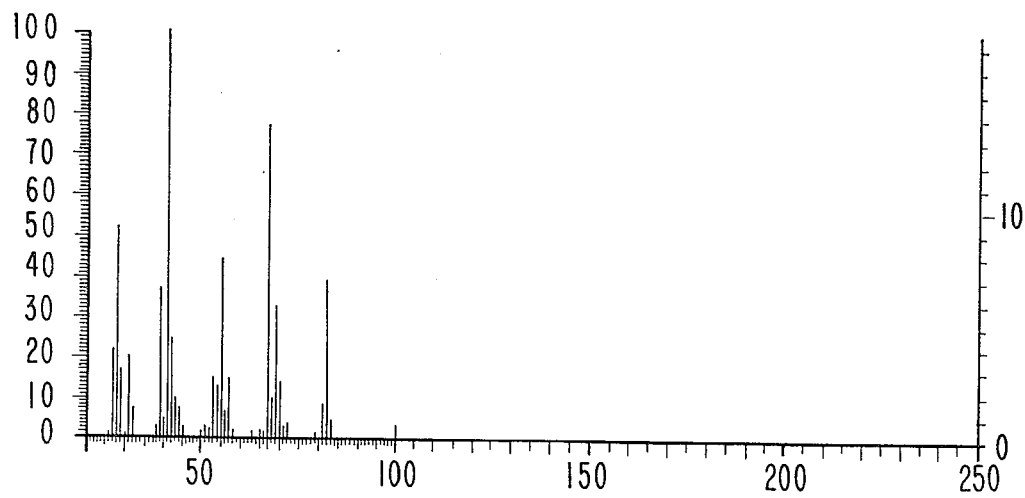
MASS SPECTRUM FOR EXAMPLE II.
FIG.4

FIG.5
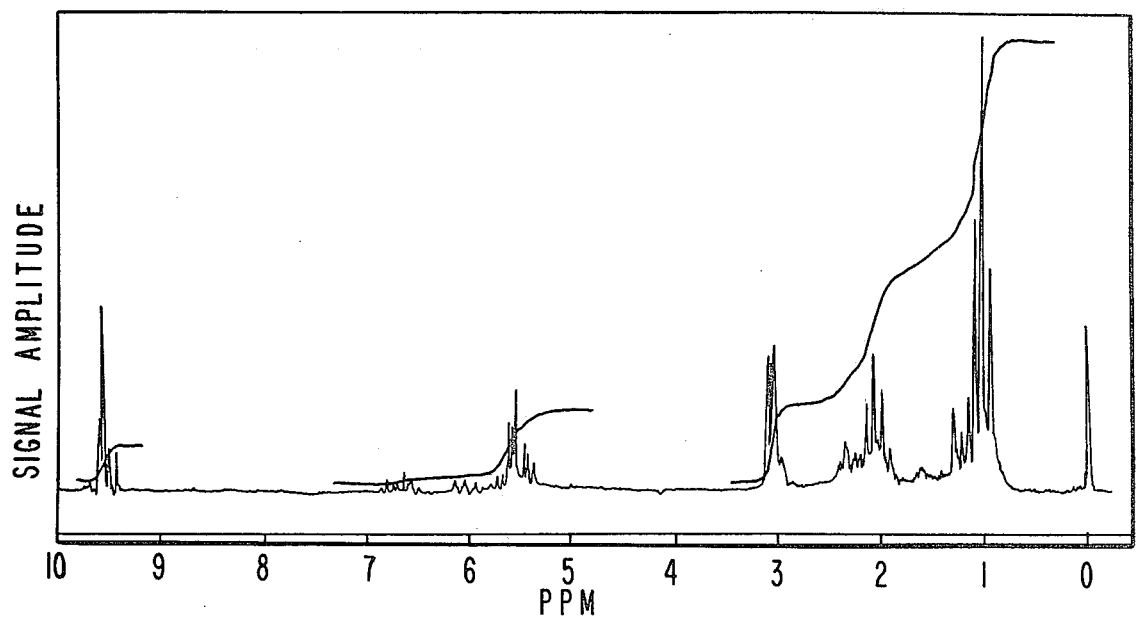
NMR SPECTRUM FOR EXAMPLE II.
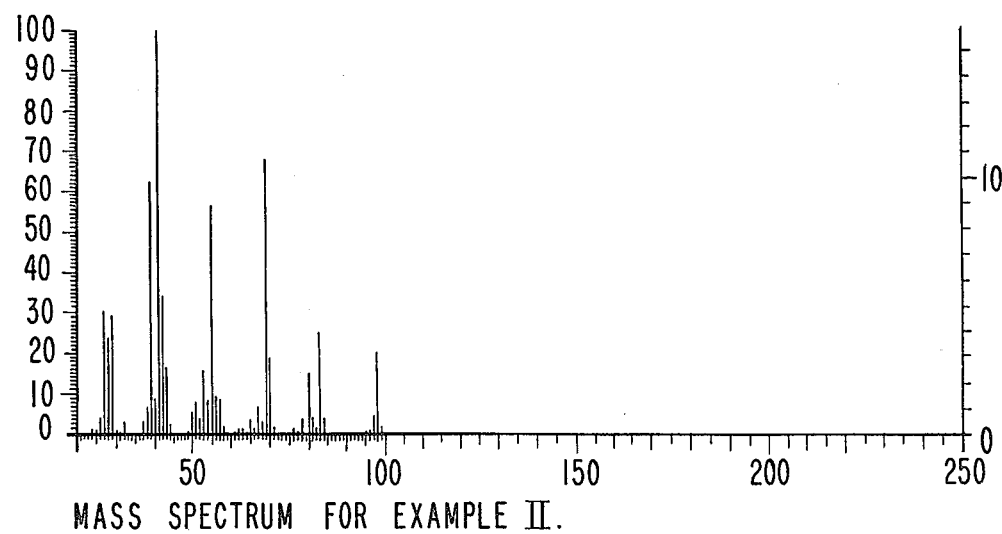
MASS SPECTRUM FOR EXAMPLE II.
FIG.6

FIG. 7
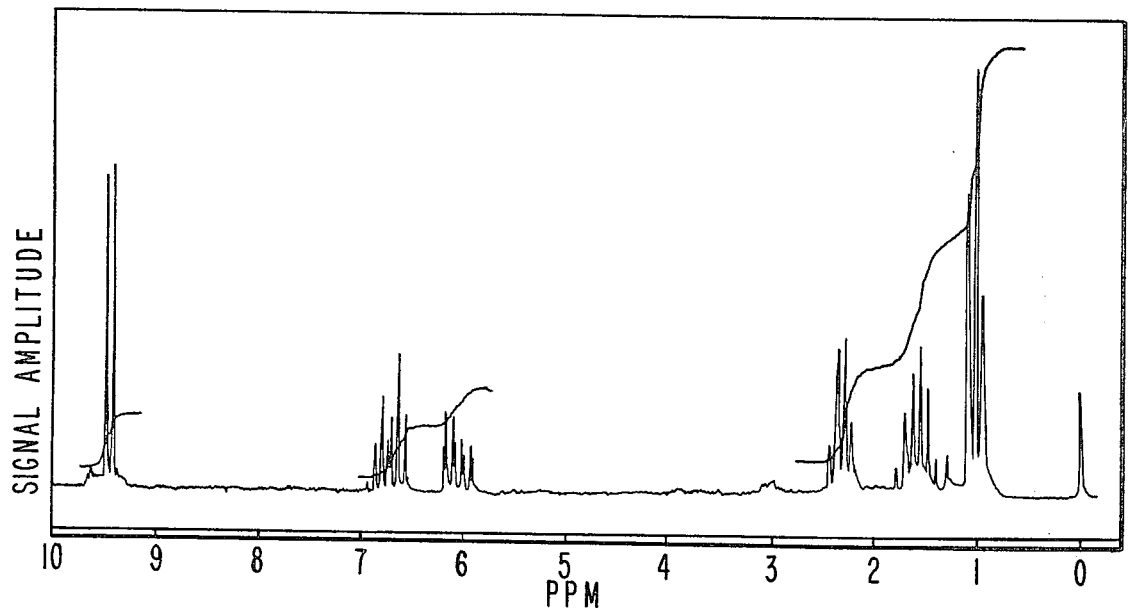
NMR SPECTRUM FOR EXAMPLE II.
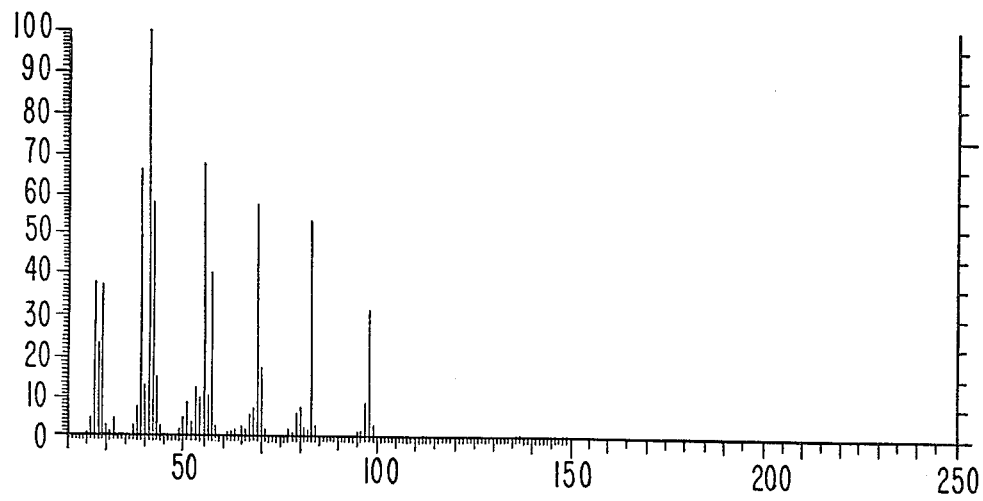
MASS SPECTRUM FOR EXAMPLE II.
FIG. 8

NMR SPECTRUM FOR EXAMPLE II.

MASS SPECTRUM FOR EXAMPLE II.

NMR SPECTRUM FOR EXAMPLE II.

MASS SPECTRUM FOR EXAMPLE II.

IR SPECTRUM FOR EXAMPLE II.

GLC PROFILE (TRAP) FOR EXAMPLE III.

GLC PROFILE FOR EXAMPLE III.

COMPOSITIONS OF MATTER CONTAINING CIS-3-HEXENAL

This application is a divisional of application for United States Letters Patent, Ser. No. 085,707 filed on Oct. 17, 1979, now United States Pat. No. 4,241,098 issued on Dec. 23, 1980.

BACKGROUND OF THE INVENTION

The present invention relates to cis-3-hexenyl derivatives having the generic structure:

wherein R is one of the moieties:

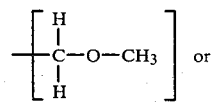 or

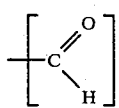

produced by the novel processes of our invention and to novel compositions using one or more of such cis-3-hexenyl derivatives to augment, modify or enhance the flavor and/or aroma of consumable materials or impart flavor and/or aroma to consumable materials.

There has been considerable work performed relating to substances which can be used to impart (modify, augment or enhance) flavors and fragrances to (on in) various consumable materials. These substances are used to diminish the use of natural materials, some of which may be in short supply, and to provide more uniform properties in the finished product.

Sweet, deep green, crushed leaf-like, fruity, pear-like, green apple-like, fresh fig-like, winey and white grape-like aroma and flavor notes are particularly desirable in many foodstuff flavors, chewing gum flavors, toothpaste flavors and medicinal product flavors, particularly in the oral hygiene area.

Powerful green, leafy, fruity, fatty and spicy aromas with strong crushed green undertones are desirable in several types of perfume compositions, perfumed articles (e.g. anionic, cationic and nonionic detergents and dryer-added fabric softener articles) and colognes.

Sweet, fruity, cooling and green aromas and tastes are desirable in connection with augmenting or enhancing the flavors or aromas of smoking tobaccos both prior to smoking and on smoking in both the mainstream and the sidestream.

The book "Perfume and Flavor Chemicals (Aroma Chemicals)" by Stephen Arctander at Monograph 1598 discloses cis-3-hexenal to have a powerful deep green, leafy odor reminiscent of strawberry leaf and wine leaf, freshly crushed. Arctander further states that cis-3-hexenal is occasionally used in perfume compositions as part of a "green" topnote complex not only for herbaceous fragrance types but also in various floral compositions. The concentrations, Arctander states, will normally be less than 0.1% in the perfume oil. Arctander further states that cis-3-hexenal is used in flavor compositions in minute traces to introduce a natural green note in many types of fruit flavors. Arctander states that concentrations in the finished product of cis-3-hexenal may be about 0.2 to 0.5 ppm. Cis-3-hexenal is stated to be produced by oxidation of hexenol and is on the GRAS list as FEMA No. 2561. Prior to our invention, however, the difficulty with using cis-3-hexenal was that it easily decomposes in the presence of oxygen. Thus a more stable form of cis-3-hexenal has been desired in the flavor and fragrance industries since the discovery of said cis-3-hexenal several decades ago.

Kajiwara, Harada and Hatanaka indicated that cis-3-hexenal may be isolated from tea leaves (Thea Sinensis) in Agr. Biol. Chem., 39 (1), 243–247, 1975. It was indicated by Kajiwara et al, that cis-3-hexenal can be produced by oxidizing cis-3-hexenol using chromium oxide-pyridine mixture in the presence of methylene dichloride or dimethylsulfoxide-phosphorous pentoxide mixture.

Such oxidizing agents as pyridinium chlorochromate having the structure:

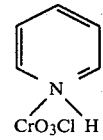

have never been disclosed to be useful in oxidizing cis-3-hexenol to produce cis-3-hexenal in admixture with other compounds whereby the mixture is stable particularly with respect to the substantivity of the cis-3-hexenal. The pyridinium chlorochromate having the structure:

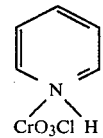

has, however, been disclosed as an oxidizing agent by Corey and Suggs in Tetrahedron Letters No. 31, pages 2647–2650, 1975 ("Pyridinium chlorochromate. An Efficient Reagent for Oxidation of Primary and Secondary Alcohols to Carbonyl Compounds"). 1-Heptanol is disclosed to be able to be oxidized to heptanal using pyridinium chlorochromate, by Corey and Suggs. Also, citronellol is disclosed by Corey and Suggs to be able to be oxidized to citronellal in at 82% yield using pyridinium chlorochromate.

Japanese published patent application No. J5 4012 309 discloses 3-hexynyl-alkylethers as long lasting perfuming agents and useful as an intermediate for the synthesis of cis-3-hexenyl ethers or pheromones. Japanese patent disclosure No. J5 4012 309 does not, however, disclose the unobvious, unexpected and advantageous organoleptic properties of cis-3-hexenyl methylether.

BRIEF DESCRIPTION OF THE DRAWINGS

FIG. 3 sets the NMR spectrum for cis-3-hexen-1-ol produced according to Example II.

FIG. 4 sets forth the mass spectrum for cis-3-hexen-1-ol produced according to Example II.

FIG. 5 sets forth the NMR spectrum for the cis-3-hexenal produced according to Example II.

FIG. 6 sets forth the mass spectrum for cis-3-hexenal produced according to Example II.

FIG. 7 sets forth the NMR spectrum for trans-2-hexenal produced according to Example II.

FIG. 8 sets forth the mass spectrum for trans-2-hexenal produced according to Example II.

THE INVENTION

Figure 2:
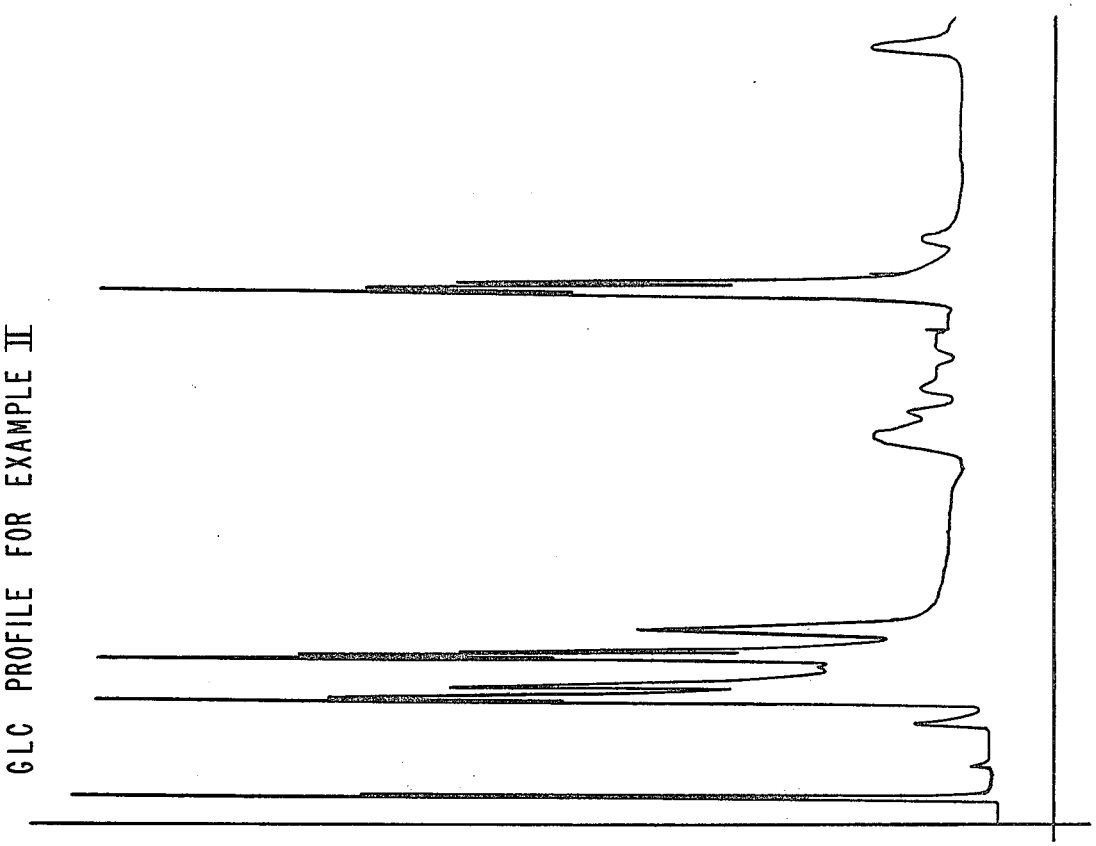
FIG. 2 sets forth the GLC profile for the reaction product of Example II.

It has now been determined that certain cis-3-hexenyl derivatives are capable of imparting a variety of flavors and fragrances to various consumable materials and are also capable of augmenting or enhancing a variety of flavors and fragrances of various consumable materials.

Briefly, our invention contemplates augmenting or enhancing the flavors and/or fragrances of such consumable materials as perfumes, perfumed articles, colognes, foodstuffs, chewing gums, toothpastes, medicinal products and smoking tobaccos by adding thereto small but effective amount of at least one compound having the generic structure:

wherein R is one of the moieties:

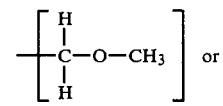   or

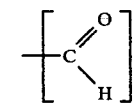

The cis-3-hexenyl derivatives of our invention augment or enhance sweet, deep green, fruity, pear-like, green apple-like, fresh fig-like, winey, white grape-like and crushed leaf flavor characteristics insofar as augmenting or enhancing the aroma or taste of foodstuffs, toothpastes, medicinal products and chewing gums.

The cis-3-hexenyl derivatives of our invention also augment or enhance the powerful green, leafy, fruity, fatty and spicy aromas and crushed green leaf undertones of perfumes, perfumed articles and colognes of our invention.

The cis-3-hexenyl derivatives of our invention also augment or enhance the sweet, fruity, cooling and green aroma characteristics of smoking tobacco prior to and on smoking in both the maintstream and the sidestream.

Examples of the cis-3-hexenyl derivatives and mixtures thereof of our invention and their organoleptic characteristics are as follows:

TABLE I

| Structure Mixture of | Compound or Mixture | Flavor Characteristics: | Fragrance Characteristics: | Tobacco Characteristics: |
|---|---|---|---|---|
| (structures shown) | Mixture containing 33.1% cis-3-hexenal; 20.8% of trans-2-hexenal; 5.5% of cis-3-hexenyl formate and 26.1% of cis-3-hexenyl-cis-3-hexenoate. | Intense crushed green leaf aroma and taste which is very long lasting; much longer lasting than cis-3-hexenal taken alone and examined previously. | Powerful green, fruity, fatty, spicy aroma with leaf alcohol nuances and an intense very stable natural green note. Stablility about 100 times that of cis-3-hexenal. | A sweet, fruity, cooling green aroma prior to and on smoking in the mainstream and the side stream. |

TABLE I-continued

| Structure Mixture of | Compound or Mixture | Flavor Characteristics: | Fragrance Characteristics: | Tobacco Characteristics: |
|---|---|---|---|---|
| 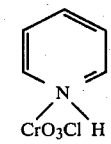 | Cis-3-hexenyl methyl ether. | A sweet, green, fruity, pear, green apple-like, fresh fig-like aroma and taste characteristic at 1ppm. Suitable for fresh fig, apple, peach and oral hygiene flavors. | Grassy, green aroma with fruit topnote and jasmine-like undertone | A sweet, fruity, cooling and green aroma characteristic prior to and on smoking in both the mainstream and the sidestream. |

Indeed the value of cis-3-hexenyl methylether has been demonstrated for various flavors:

A. In strawberry flavor cis-3-hexenyl methylether at 0.01% adds a fresh fruit character both in aroma and taste.
B. In pineapple flavor cis-3-hexenyl methyl ether at 0.05% gives a fresh pineapple character depressing the canned notes and creates a substantially more pleasant and more intense aroma.
C. In peach flavor at 0.02% cis-3-hexenyl methyl ether imparts freshness and a natural peach character of great intensity.
D. In peppermint oil (natural), cis-3-hexenyl methylether at the rate of 0.05% gives an aroma lift, a fresher character both in aroma and taste. Indeed, cis-3-hexenyl methylether is essential in the creation of artificial peppermint flavors and for oral hygiene products.
E. In raspberry flavor cis-3-hexenyl methylether at 0.01% adds and enhances the seedy/green kernel notes both in aroma and taste and rounds out the flavor making it fuller and more natural like.

An important aspect of this invention is the creation of crushed leaf aroma and taste of a very high stability of a new composition of matter containing cis-3-hexenal. This composition of matter not only contains cis-3-hexenal having the structure:

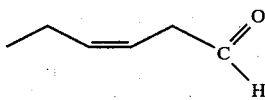

but in addition contains cis-3-hexenyl formate and/or cis-3-hexenol; and trans-2-hexenal; and cis-3-hexenyl cis-3-hexenoate. Trans-2-hexenal has the structure:

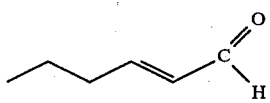

cis-3-hexenyl formate has the structure:

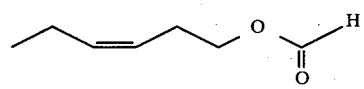

cis-3-hexenyl cis-3-hexenoate has the structure:

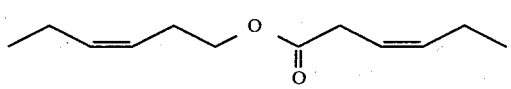

Thus, the quantities of substances in the composition of our invention which contains the cis-3-hexenal are as follows:
Cis-3-hexenal from 20% up to 80%;
Trans-2-hexenal from 5% up to 40%;
Cis-3-hexenyl formate from 0% up to 20%;
Cis-3-hexenol from 0% up to 40%;
Cis-3-hexenyl-cis-3-hexenoate from 1% up to 10%;
the percentages being "mole" percentages.

The foregoing mixture is useful in all fruit flavors, vegetable flavors, savory flavors and many others. This mixture can prepared by reacting cis-3-hexenol with pyridinium chlorochromate having the structure:

according to the reaction sequence:

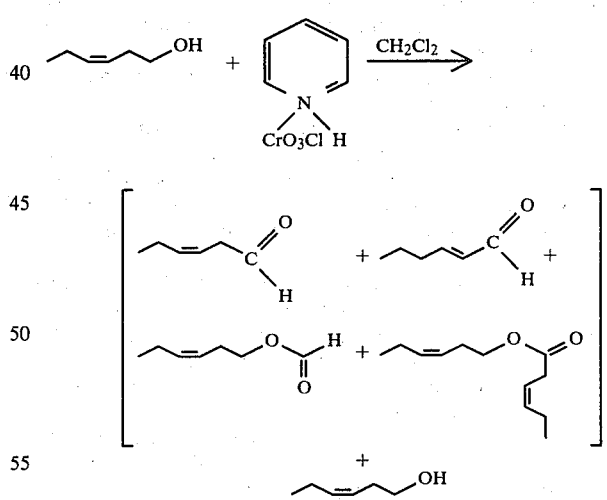

The mole ratio of cis-3-hexenol:pyridinium chlorochromate initially in the reaction mass may vary from 1:0.5 up to 1:2 with a preferred mole ratio of cis-3-hexenol:pyridinium chlorochromate of 1:1.5. It is preferred that the reaction be carried out in a solvent such as methylene chloride. The concentration of cis-3-hexenol in the methylene chloride is from about 0.2 up to about 1.5 moles per liter with a preferred concentration of cis-3-hexenol in the methylene chloride of 0.5 M.

Cis-3-hexenol is also used to prepare the cis-3-hexenyl methylether by reaction of cis-3-hexenol with an etherifying agent such as sodium hydride and methyliodide. The reactions can be carried out in the presence of dimethylformamide or diethylbenzene according to the following reaction scheme:

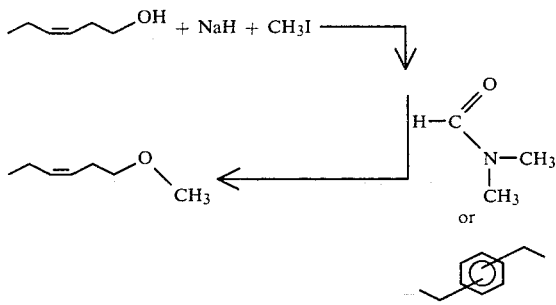

The reaction wherein cis-3-hexenol is oxidized to the composition of matter containing the cis-3-hexenal using the pyridinium chlorochromate may be carried out also according to the conditions as specified in the paper by Corey and Suggs, Tetrahedron Letters, No. 31, pages 2647–2650, 1975 (Title: "Pyridinium Chlorochromate; an Efficient Reagent for Oxidation of Primary and Secondary Alcohols to Carbonyl Compounds").

When the cis-3-hexenyl derivatives of our invention are used as food flavor adjuvants, the nature of the co-ingredients included with said cis-3-hexenyl derivatives in formulating the product composition will also serve to alter, modify, augment or enhance the organoleptic characteristics of the ultimate foodstuff treated therewith.

As used herein in regard to flavors, the terms "alter", "modify" and "augment" in their various forms means "supplying or imparting flavor character or note to otherwise bland, relatively tasteless substances or augmenting the existing flavor characteristic where a natural flavor is deficient in some regard or supplementing the existing flavor impression to modify its quality, character or taste".

The term "enhance" is used herein to mean the intensification of a flavor or aroma characteristic or note without the modification of the quality thereof. Thus, "enhancement" of a flavor or aroma means that the enhancement agent does not add any additional flavor note.

As used herein, the term "foodstuff" includes both solid and liquid ingestible materials which usually do, but need not, have nutritional value. Thus, foodstuffs include soups, convenience foods, beverages, dairy products, candies, vegetables, cereals, soft drinks, snacks, and the like.

The term "chewing gum" is intended to mean a composition which comprises a substantially water insoluble, chewable plastic gum base such as chicle, or substitutes therefor, including jelutong, guttakay rubber or certain comestible natural or synthetic resins or waxes. Incorporated with the gum base in admixture therewith may be plasticizers or softening agents, e.g., glycerine, and a flavoring composition which incorporates one or more of the cis-3-hexenyl derivatives of our invention, and in addition, sweetening agents which may be sugars, including sucrose or dextrose and/or artificial sweeteners such as cyclamates or saccharin. Other optional ingredients may also be present.

Substances suitable for use herein as co-ingredients or flavoring adjuvants are well known in the art for such use, being extensively described in the relevant literature. It is a requirement that any such material be "ingestibly" acceptable and thus non-toxic and otherwise non-deleterious particularly from an organoleptic standpoint whereby the ultimate flavor and/or aroma of the consumable material used is not caused to have unacceptable aroma and taste nuances. Such materials may in general be characterized as flavoring adjuvants or vehicles comprising, broadly, stabilizers, thickeners, surface active agents, conditioners, other flavorants and flavor intensifiers.

Stabilizer compounds include preservatives, e.g., sodium chloride; antioxidants, e.g., calcium and sodium ascorbate, ascorbic acid, butylated hydroxyanisole (mixture of 2- and 3-tertiary-butyl-4-hydroxy anisole), butylated hydroxytoluene (2,6-di-tertiary-butyl-4-methyl phenol), propyl gallate and the like, and sequestrants, e.g., citric acid.

Thickener compounds include carriers, binders, protective colloids, suspending agents, emulsifiers and the like, e.g., agar agar, carrageenan; cellulose and cellulose derivatives such as carboxymethyl cellulose and methyl cellulose; natural and synthetic gums such as gum arabic, gum tragacanth; gelatin, proteinaceous materials; lipids, carbohydrates; starches, pectins, and emulsifiers, e.g., mono- and diglycerides of fatty acids, skim milk powder, hexoses, pentoses, disaccharides, e.g., sucrose, corn syrup and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like; buffers and neutralizing agents, e.g., sodium acetate, ammonium bicarbonate, ammonium phosphate, citric acid, lactic acid, vinegar and the like; colorants, e.g., carminic acid, cochineal, tumeric and curcuma and the like, firming agents such as aluminum sodium sulfate, calcium chloride and calcium gluconate; texturizers, anti-caking agents, e.g., aluminum calcium sulfate and tri-basic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., acetic acid, formic acid, 2-hexenoic acid, benzoic acid, n-butyric acid, caproic acid, caprylic acid, cinnamic acid, isobutyric acid, isovaleric acid, alpha-methylbutyric acid, propionic acid, valeric acid, 2-methyl-2-pentenoic acid, and 2-methyl-3-pentenoic acid; ketones and aldehydes, e.g., acetaldehyde, acetophenone, acetone, acetyl methyl carbinol, acrolein, n-butanal, crotonal, diacetyl, 2-methylbutananl, beta,-beta-dimethyl acrolein, methyl n-amyl ketone, n-hexanal, 2-hexenal, isopentanal, hydrocinnamic aldehyde, 2-heptenal, nonyl aldehyde, 4-(p-hydroxyphenyl)-2-butanone, alpha-ionone, beta-ionone, 2-methyl-3-butanone, benzaldehyde, beta-damascone, alpha-damascone, beta-damascenone, acetophenone, 2-heptanone, o-hydroxy-acetophenone, 2-methyl-2-hepten-6-one, 2- octanone, 2-undecanone, 3-phenyl-4-pentenal, 2-phenyl-2-hexenal, 2-phenyl-2-pentenal, furfural, 5-methylfurfural, cinnamaldehyde, beta-cyclohomocitral, 2-pentanone, 2-pentenal and propanal; alcohols such as 1-butanol, benzyl alcohol, 1-borneol, trans-2-buten-1-ol, ethanol, geraniol, 1-hexanol, 2-heptanol, trans-2-hexenol-1, 3-methyl-3-buten-1-ol, 1-pentanol, 1-penten-3-ol, p-hydroxyphenyl-2-ethanol, isoamyl alcohol, isofenchyl alcohol, phenyl-2-ethanol, alpha-terpineol, cis-terpinhydrate, eugenol, linalool, 2-heptanol, acetoin; esters, such as butyl acetate, ethyl acetate, ethyl acetoacetate, ethyl benzoate, ethyl butyrate, ethyl caprate, ethyl caproate, ethyl carpylate, ethyl cinnamate, ethyl crotonate, ethyl formate, ethyl isobutyrate, ethyl isovalerate, ethyl laurate, ethyl myristate, ethyl alpha-methylbutyrate, ethyl propionate, ethyl salicylate, trans-2-hexenyl acetate, hexyl acetate, 2-hexenyl butyrate, hexyl butyrate, isoamyl acetate, isopropyl butyrate, methyl acetate, methyl butyrate, methyl caproate, methyl isobutyrate, alpha-methylphenylglycidate, ethyl succinate, isobutyl cinnamate, cinnamyl formate, methyl cinnamate, and terpenyl acetate; hydrocarbons such as dimethyl naphthalene, dodecane, methyldiphenyl, methyl naphthalene, myrcene, naphthalene, octadecane, tetradecane, tetramethylnaphthalene, tridecane, trimethylnaphthalene, undecane, caryophyllene, alphaphellandrene, beta-phellandrene, p-cymene, 1-alpha-pinene, beta-pinene, dihydrocarveol; pyrazines such as 2,3-dimethylpyrazine, 2,5-dimethylpyrazine, 2,6-dimethylpyrazine, 3-ethyl-2,5-dimethylpyrazine, 2-ethyl-3,5,6-trimethylpyrazine, 3-isoamyl-2,5-dimethylpyrazine, 5-isoamyl-2,3-dimethylpyrazine, 2-isoamyl-3,5,6-trimethylpyrazine, isopropyl dimethylpyrazine, methyl ethylpyrazine, tetramethylpyrazine, trimethylpyrazine; essential oils such as jasmine absolute, cassia oil, cinnamon bark oil; black pepper oleoresin, oil of black pepper, rose absolute, orris absolute, oil of cubeb, oil of coriander, oil of pimento leaf, oil of patchouli, oil of nutmeg, lemon essential oil, safran oil, Bulgarian rose, capsicum, yara yara and vanilla; lactones such as gamma-nonalactone; sulfides, e.g., methyl sulfide and other materials such as maltol, and acetals (e.g., 1,1-diethoxyethane, 1,1-dimethyloxyethane and dimethoxymethane), piperine, chavicine, and piperidine.

The specific flavoring adjuvant selected for use may be either solid or liquid depending upon the desired physical form of the ultimate product, i.e., foodstuff, whether simulated or natural, and should, in any event, (i) be organoleptically compatible with the cis-3-hexenyl derivatives of our invention by not covering or spoiling the organoleptic properties (aroma and/or taste) thereof; (ii) be non-reactive with the cis-3-hexenyl derivatives of our invention and (iii) be capable of providing an environment in which the cis-3-hexenyl derivatives can be dispersed or admixed to provide a homogeneous medium. In addition, selection of one or more flavoring adjuvants, as well as the quantities thereof will depend upon the precise organoleptic character desired in the finished product. Thus, in the case of flavoring compositions, ingredient selection will vary in accordance with the foodstuff, chewing gum, medicinal product or toothpaste to which the flavor and/or aroma are to be imparted, modified, altered or enhanced. In contradistinction, in the preparation of solid products, e.g., simulated foodstuffs, ingredients capable of providing normally solid compositions should be selected such as various cellulose derivatives.

As will be appreciated by those skilled in the art, the amount of cis-3-hexenyl derivatives employed in a particular instance can vary over a relatively wide range, depending upon the desired organoleptic effects to be achieved. Thus, correspondingly, greater amounts would be necessary in those instances wherein the ultimate food composition to be flavored (e.g. with a grape flavor or an oral hygiene-type flavor) is relatively bland to the taste, whereas relatively minor quantities may suffice for purposes of enhancing the composition merely deficient in natural flavor or aroma. The primary requirement is that the amount selected be effective, i.e., sufficient to alter, modify or enhance the organoleptic characteristics of the parent composition, whether foodstuff per se, chewing gum per se, medicinal product per se, toothpaste per se, or flavoring composition.

The use of insufficient quantities of one or more cis-3-hexenyl derivatives of our invention will, of course, substantially vitiate any possibility of obtaining the desired results while excess quantities prove needlessly costly and in extreme cases may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, chewing gum compositions, medicinal product compositions and toothpaste compositions, it is found that quantities of cis-3-hexenyl derivatives ranging from a small but effective amount, e.g., 0.05 parts per million up to about 500 parts per million based on total composition, are suitable. Concentrations in excess of the maximum quantity stated are not normally recommended since they fail to provide commensurate enhancement of organoleptic properties. In those instances wherein the cis-3-hexenyl derivatives are added to the foodstuff as an integral component of a flavoring composition, it is of course, essential that the total quantity of flavoring composition employed be sufficient to yield an effective cis-3-hexenyl derivative concentration in the foodstuff product.

Food flavoring compositions prepared in accordance with the present invention preferably contain the cis-3-hexenyl derivatives in concentrations ranging from about 0.025% up to about 15% by weight based on the total weight of the said flavoring composition.

The composition described herein can be prepared according to conventional techniques well known as typified by cake batters and fruit drinks and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by mixing the cis-3-hexenyl derivatives with, for examples, gum arabic, gum tragacanth, carrageenan and the like, and thereafter spray-drying the resultant mixture whereby to obtain the particular solid product. Pre-prepared flavor mixes in powder form, e.g., a fruit-flavored powder mix, are obtained by mixing the dried solid components, e.g., starch, sugar and the like, and cis-3-hexenyl derivatives in a dry blender until the requisite degree of uniformity is achieved.

It is preferred to combine with the cis-3-hexenyl derivatives of our invention the following adjuvants: methyl anthranilate; ethyl heptanoate; diethylmalonate;

ethyl benzoate; ethyl butyrate; ethyl acetate; benzyl acetate; peppermint oil; spearmint oil; clove oil; anethole; cardamon oil; oil of wintergreen; cinnamic aldehyde; heliotropine; benzaldehyde; paratoluacetaldehyde; vanillin; phenylacetaldehyde; benzyl acetate; maltol; benzylalcohol; and ethyl-3-methyl-3-phenyl-glycidate.

The cis-3-hexenyl derivatives of our invention can be used to contribute powerful green, leafy, fruity, fatty and spicy aromas with powerful long-lasting stable crushed green leaf nuances to perfumes, perfumed articles and colognes. Examples of perfumed articles are anionic, cationic and nonionic detergents and dryer-added fabric softeners. As olfactory agents the cis-3-hexenyl derivatives of our invention can be formulated into or used as components of a "perfume composition" or can be used as components of a "perfumed article" or the perfume composition may be added to perfumed articles.

The term "perfume composition" is used herein to mean a mixture of organic compounds including, for example, alcohols, aldehydes, ketones, nitriles, ethers, lactones, natural essential oils, synthetic essential oils and frequently hydrocarbons which are admixed so that the combined odors of the individual components produce a pleasant or desired fragrance. Such perfume compositions usually contain: (a) the main note or the "bouquet" or foundationstone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling, fresh-smelling materials.

In perfume compositions, the individual component will contribute its particular olfactory characteristics, but the overall effect of the perfume composition will be the sum of the effects of each of the ingredients. Thus, the individual compounds of this invention, or mixtures thereof, can be used to alter the aroma characteristics of a perfume composition, for example, by highlighting or moderating the olfactory reaction contributed by another ingredient in the composition.

The amount of the cis-3-hexenyl derivatives of this invention which will be effective in perfume compositions depends on many factors, including the other ingredients, their amounts and the effects which are desired. It has been found that perfume compositions containing as little as 0.5% of the cis-3-hexenyl derivatives of this invention, or even less, can be used to impart an interesting green, leafy, fruity, fatty, spicy aroma to soaps, liquid and solid cationic, anionic and nonionic detergents, cosmetics, powders, liquid and solid fabric softeners, optical brightener compositions, and other products. The amount employed can range up to 50% higher and will depend on considerations of cost, nature of the end product, and the effect desired on the finished product and particular fragrance sought.

The cis-3-hexenyl derivatives of this invention can be used alone or in a perfume composition as an olfactory component in detergents and soaps, space odorants and deodorants; colognes, toilet waters; bath salts; hair preparations such as lacquers, brilliantines, pomades, and shampoos; cosmetic preparations such as creams, deodorants, hand lotions, and sun screens; powders such as talcs, dusting powders, face powder, and the like. When used as an olfactory component of a perfumed article, as little as 0.01% of one or more of the cis-3-hexenyl derivatives will suffice to impart an interesting green, leafy, fruity, fatty, spicy aroma. Generally, no more than 0.5% is required.

In addition, the perfume composition can contain a vehicle or carrier for the cis-3-hexenyl derivatives alone or with other ingredients. The vehicle can be a liquid such as an alcohol such as ethanol, a glycol such as propylene glycol, or the like. The carrier can be an absorbent solid such as a gum or components for encapsulating the composition such as gelatin which can be used to form a capsule wall surrounding the perfume oil as by means of coacervation.

An additional aspect of our invention provides an orangoleptically improved smoking tobacco product and additives therefor including methods of making the same which overcome problems heretofore encountered in the creation or enhancement of specific desired sweet, fruity, cooling and green notes. Such notes, both prior to and on smoking, in both the main stream and the side stream, may now be readily controlled and maintained at the desired uniform level regardless of variations in the tobacco components of the blend; or the nature of the filter used in conjunction with the smoking tobacco article.

This invention further provides improved tobacco additives and additives for materials used in the fabrication of tobacco articles (particularly smoking tobacco articles) and methods whereby desirable sweet, fruity, cooling and green notes may be imparted to smoking tobacco products and may be readily varied and controlled to produce the desired uniform flavoring characteristics.

In carrying out this aspect of our invention, we add to smoking tobacco materials or a suitable substitute therefor (e.g., dried lettuce leaves) an aroma and flavor additive containing as an active ingredient, one or more of the cis-3-hexenyl derivatives of our invention.

In addition to the cis-3-hexenyl derivatives of our invention, other flavoring and aroma additives may be added to the smoking tobacco material or substitute therefor either separately or in mixture with one or more of the cis-3-hexenyl derivatives of our invention.

I. SYNTHETIC MATERIALS

Beta-methylcinnamaldehyde;
Eugenol;
Dipentene;
Damascenone;
Maltol;
Ethyl maltol;
Delta-undecalactone;
Delta-decalactone;
Benzaldehyde;
Amyl acetate;
Ethyl butyrate;
Ethyl valerate;
Ethyl acetate;
2-Hexen-1-ol;
2-Methyl-5-isopropyl-1,3-nonadiene-8-one;
2-Methyl-5-isopropylacetophenone;
2-Hydroxy-2,5,5,8a(-tetramethyl-1-)2-hydroxyethyl)-decahydronaphthalene;
Dodecahydro-3a,6,6,9a-tetramethylnaphtho(2,1-B)-furan;
4-Hydroxyhexenoic acid, gamma-lactone;
Polyisoprenoid hydrocarbons defined in Example V of U.S. Pat. No. 3,589,372 issued on June 29, 1971

II. NATURAL OILS

Celery seed oil;
Coffee extract;
Bergamot oil;
Cocoa extract;
Nutmeg oil;
Origanum oil;

An aroma and flavoring concentrate containing one or more of the cis-3-hexenyl derivatives of our invention and, if desired, one or more of the above-indicated additional flavoring additives may be added to the smoking tobacco material, to the filter or to the leaf or paper wrapper or to a filter which is part of the smoking article. The smoking tobacco material may be shredded, cured, cased on blended tobacco material or reconstituted tobacco material or tobacco substitutes (e.g., lettuce leaves) or mixtures thereof. The proportions of flavoring additives may be varied in accordance with taste, but insofar as enhancement or the imparting of sweet, fruit, cooling and green notes prior to and on smoking, in both the main stream and the side stream, we have found that satisfactory results are obtained if the proportion by weight of the sum total of cis-3-hexenyl derivatives to smoking tobacco material is between 50 ppm and 1500 ppm (0.005%–0.15%) of the active ingredients to the smoking tobacco material. We have further found that satisfactory results are obtained if the proportions by weight of the sum total of cis-3-hexenyl derivatives used to flavoring material is between 0.05:1 and 0.50:1.

Any convenient method for incorporating the cis-3-hexenyl derivatives in the tobacco product may be employed. Thus the cis-3-hexenyl derivatives taken alone or along with other flavoring additives may be dissolved in a suitable solvent such as food grade ethanol, pentane, diethyl ether and/or other voltaile organic solvents, and the resulting solution may either be sprayed on the cured, cased and blended tobacco material; or the tobacco material or filter may be dipped into such solution. Under certain circumstances, a solution of one or more cis-3-hexenyl derivatives taken alone or taken further together with other flavoring additives as set forth above, may be applied by means of a suitable applicator such as a brush or roller on the paper or leaf wrapper for the smoking product, or it may be applied to the filter by either spraying or dipping or coating.

Furthermore, it will be apparent that only a portion of the tobacco or substitute therefor need be treated, and the thus-treated tobacco may be blended with other tobaccos before the ultimate tobacco product is formed. In such cases, the tobacco treated may have one or more cis-3-hexenyl derivatives of our invention in excess of the amounts of concentrations above indicated so that when blended with other tobaccos, the final product will have the percentage within the indicated range.

While our invention is particularly useful in the manufacture of smoking tobacco such as cigarette tobacco, cigar tobacco and pipe tobacco, other tobacco products formed from sheeted tobacco dust or fines may also be used. As stated supra, the cis-3-hexenyl derivatives of our invention can be incorporated with materials such as filter tip materials, seam paste, packaging materials and the like which are used along with the tobacco to form a product adapted for smoking. Furthermore, the cis-3-hexenyl derivatives of our invention can be added to certain tobacco substitutes of natural or synthetic origin (e.g., dried lettuce leaves) and, accordingly, by the term "tobacco" as used throughout this specification is meant any composition intended for human consumption, by smoking or otherwise, whether composed of tobacco plant parts of substitute materials or both.

It will thus be apparent that the cis-3-hexenyl derivatives of our invention can be utilized to alter, modify, augment or enhance sensory properties, particularly organoleptic properties, such as flavor(s) and/or fragrance(s) of a wide variety of consumable materials.

The following examples serve to illustrate our invention, and this invention is to be considered restricted thereto only as indicated in the appended claims.

All parts and percentages given herein are by weight unless otherwise specified.

EXAMPLE I

Preparation of Composition Containing Cis-3-Hexenal

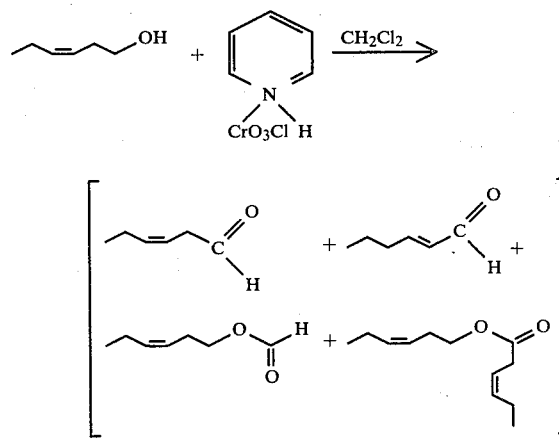

Into a 500 ml, three-necked, reaction flask equipped with mechanical stirrer, Friedrichs condenser and thermometer is placed 300 cc of methylene chloride and 19.0 grams of pyridine. While stirring vigorously, 12.0 grams of chromium trioxide are added over a 10–15 minute period. The color of the mixture changes from yellow to dark purple. When addition is about two thirds complete, the temperature slowly begins to rise attaining a maximum of 34° C. by the time of completion of addition. The reaction mixture is then stirred for 15 minutes at room temperature. 2.0 Grams of cis-3-hexenol in about 2.0 grams of methylene chloride is added in one portion. Stirring is continued for 15 minutes at room temperature. The reaction mixture is then filtered (using a Buchner funnel with Celite) and then through silica gel (using a sintered glass funnel of medium porosity). Almost all of the color is removed from the reaction mixture. The reaction mixture is then extracted with three 50 cc portions of one molar hydrochloric acid to remove residual pyridine. After drying the reaction mass is concentrated under nitrogen.

Figure 1:
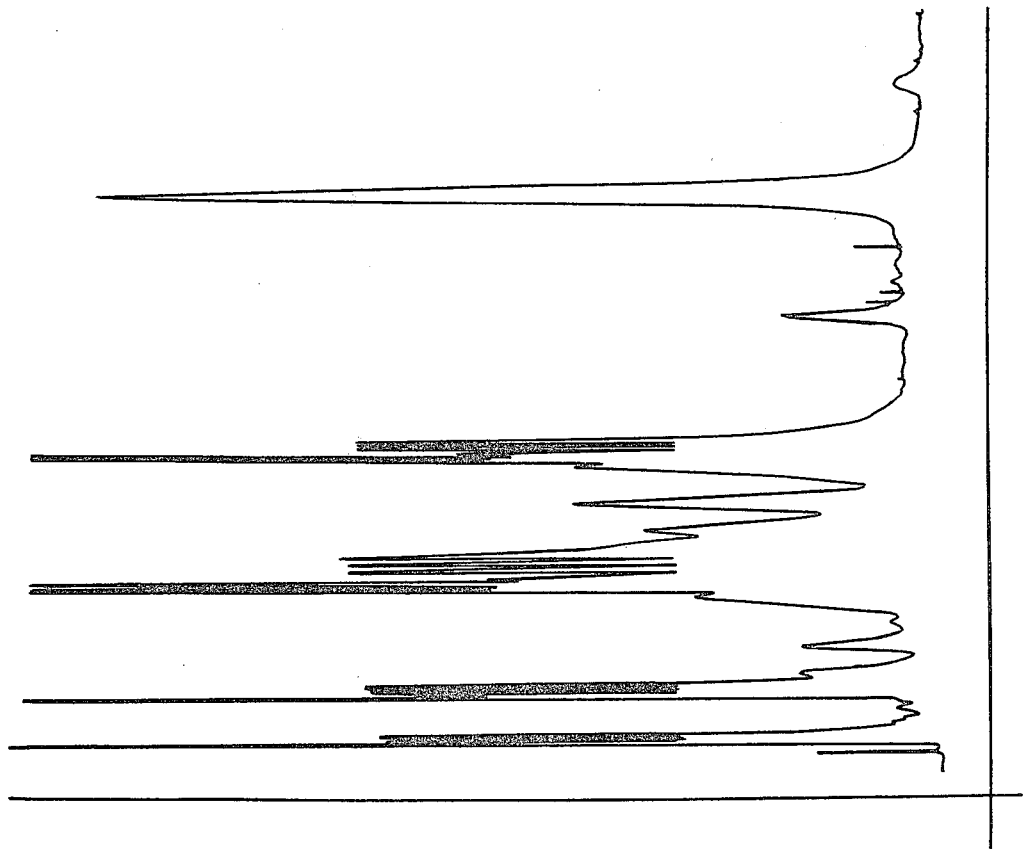
FIG. 1 sets forth the GLC profile for the reaction product of Example I.

FIG. 1 is the GLC profile of the reaction mixture.

Analysis on an 8 ft.×⅛ in. 5% Carbowax column indicates the formation of a peak (13.6%) which is identified by mass spectral analysis as cis-3-hexenal.

The foregoing reaction is repeated using a 500 ml, three-necked reaction flask, equipped with mechanical stirrer, thermometer and addition funnel.

184 ml of six molar hydrochloric acid is charged to a 500 ml three-necked reaction flask equipped with a thermometer and mechanical stirrer. 100 Grams (1 mole) of chromium trioxide is rapidly added with stirring. After five minutes the temperature is lowered to 0° C. using a dry ice-isopropanol bath and 79.1 grams (1 mole) of pyridine is carefully added over a 20 minute period. The temperature of the reaction mass rises to about 35° C. and the reaction mixture is again cooled to 0° C. A yellow-orange solid separates. The yellow-orange solid is collected on a Buchner funnel and dried over 90 minutes. It is then placed in vacuum for 90 minutes.

200 ml of methylene chloride and 32.3 grams (0.15 moles) of pyridinium chlorochromate and 2.46 grams (0.03 moles) of sodium acetate are charged to a 500 ml three-necked reaction flask equipped with mechanical stirrer, thermometer and addition funnel.

10 Grams (0.1 moles) of cis-3-hexenol and 20 ml methylene chloride are then added rapidly over a 2 minute period. The reaction mixture is then stirred for a period of 15 minutes during which time the temperature is allowed to rise reaching a maximum of 40° C. The resulting liquid is decanted and the residue is washed with diethylether. The combined organic layers are then filtered through silica gel on a sintered glass funnel, dried and concentrated. The GLC profile indicates 61.0% cis-3-hexenal and 29.5% of cis-3-hexenol. Removal of most of the solvent yields 6.14 grams of which 31.3% is cis-3-hexenal and 19.4% is cis-3-hexenol.

EXAMPLE II

Preparation Of Composition Containing Cis-3-Hexenal In Stable Form

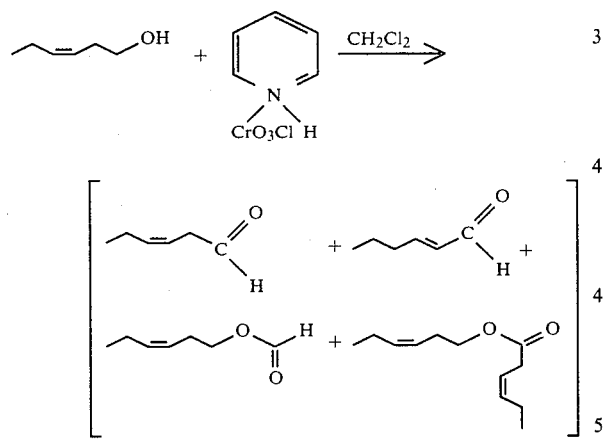

Into a 1000 ml three-necked reaction flask equipped with mechanical stirrer, thermometer, addition funnel, dry ice-isopropanol bath and condenser is placed 368 cc of six molar hydrochloric acid. To the hydrochloric acid is added 200 grams (2 moles) of chromium trioxide, rapidly, with stirring. After 5 minutes the reaction mixture is cooled to 0° C. and 158.2 grams (2 moles) of pyridine is added over a period of 20 minutes. The reaction mass is cooled to 0° C. and a yellow-orange solid is obtained which is collected on a sintered glass funnel under maximum house vacuum. Suction is maintained until no more liquid filtrate is obtained (2.5 hours).

323 Grams of the pyridinium chlorochromate thus obtained are added to 2000 ml methylene chloride. 100 Grams of cis-3-hexenol in 100 cc of methylene chloride are added to the reaction mass. The resulting mixture turns black and a solid separates. The reaction temperature rises to 40° C. over a period of 15 minutes and begins to reflux. The progress of the reaction is monitored by GC indicating the following reaction products:

| Time | Cis-3-Hexenal | Trans-2-Hexenal | Cis-3-Hexenol |
|---|---|---|---|
| 2 minutes | 8.7% | 3.2% | 87.1% |
| 25 minutes | 35.0% | 9.5% | 37.8% |
| 40 minutes | 37.0% | 15.9% | 26.6% |

The reaction mass is then quenched by cooling to 25° C. with wet ice. It is then filtered through Celite (100 grams). The reaction flask is rinsed with two 50 cc diethylether portions and the filtrate is filtered through 100 grams of silica gel. The filtrate is dried and concentrated. The conversion to and yield of cis-3-hexenal is 26.0% conversion and 32.8% yield.

The 81.32 grams of crude product is placed on a 500 gram column of 5% water-deactivated silica gel and eluted with 2 liters of 20% diethylether:hexane. 24.8 Grams of product are obtained and its composition is as follows:

Cis-3-hexenal 33.1%;
Trans-2-hexenal 20.8%;
Cis-3-hexenol 26.1%;
Cis-3-hexenyl-cis-3-hexenoate 2.7%
Cis-3-hexenyl formate 12.7%

This sample has interesting highly stable light green crushed leaf notes at 0.01 ppm. Compared with trans-2-hexenal at 0.1 ppm both materials are completely different with mixture containing the cis-3-hexenal being much more powerful and the trans-2-hexenal being very weak. The apple juice aroma is intense and unique.

Figure 9:
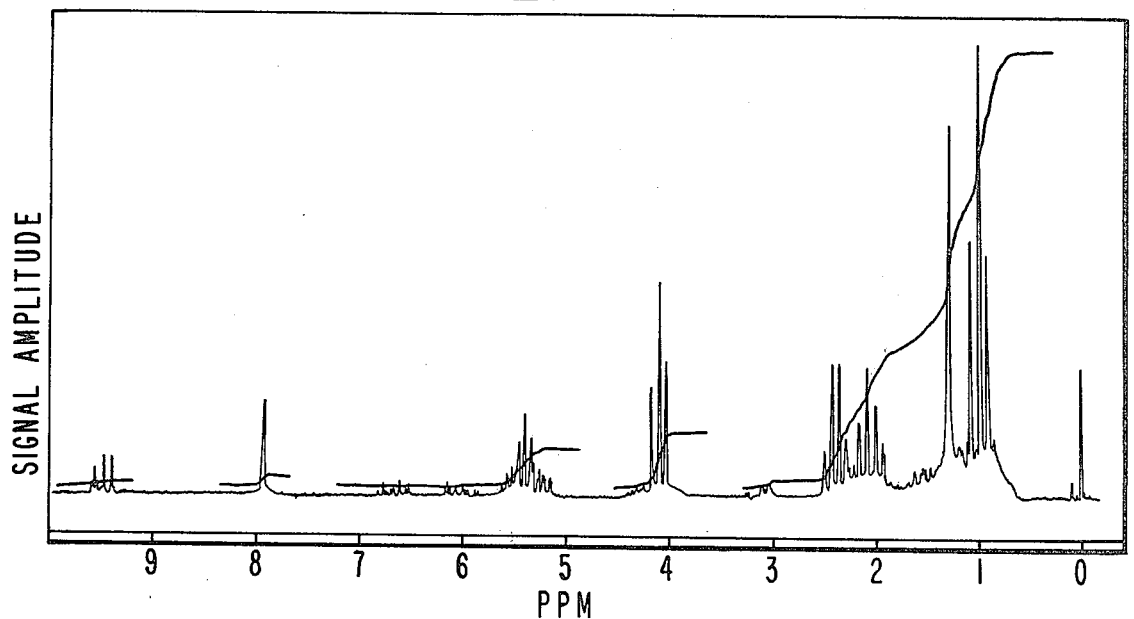
FIG. 9 sets forth the NMR spectrum for cis-3-hexenyl formate produced according to Example II.
Figure 10:
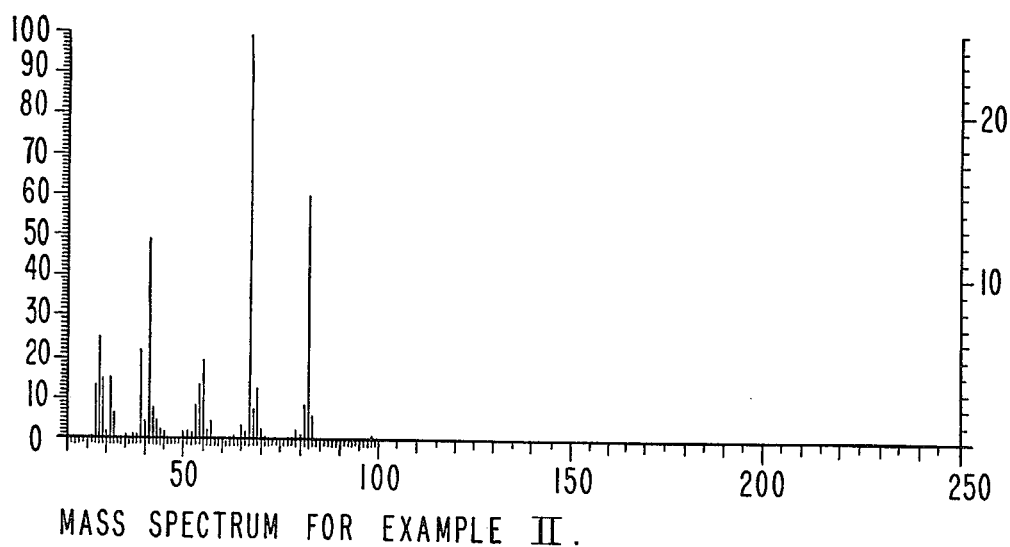
FIG. 10 sets forth the mass spectrum for cis-3-hexenyl formate produced according to Example II.
Figure 11:
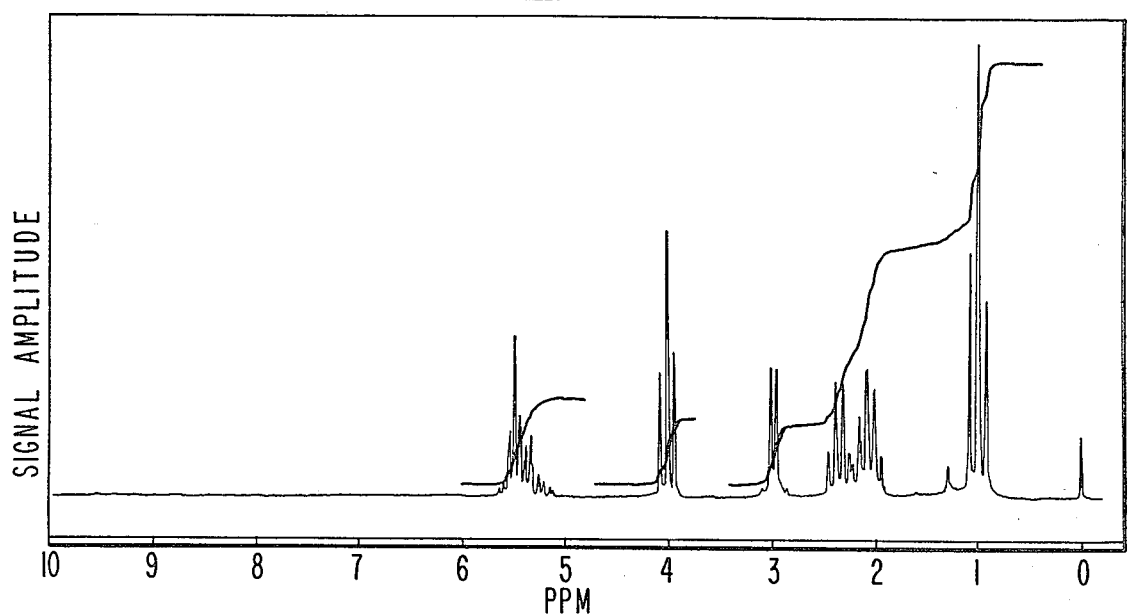
FIG. 11 sets forth the NMR spectrum for cis-3-hexenyl-cis-3-hexenoate produced according to Example II.
Figure 12:
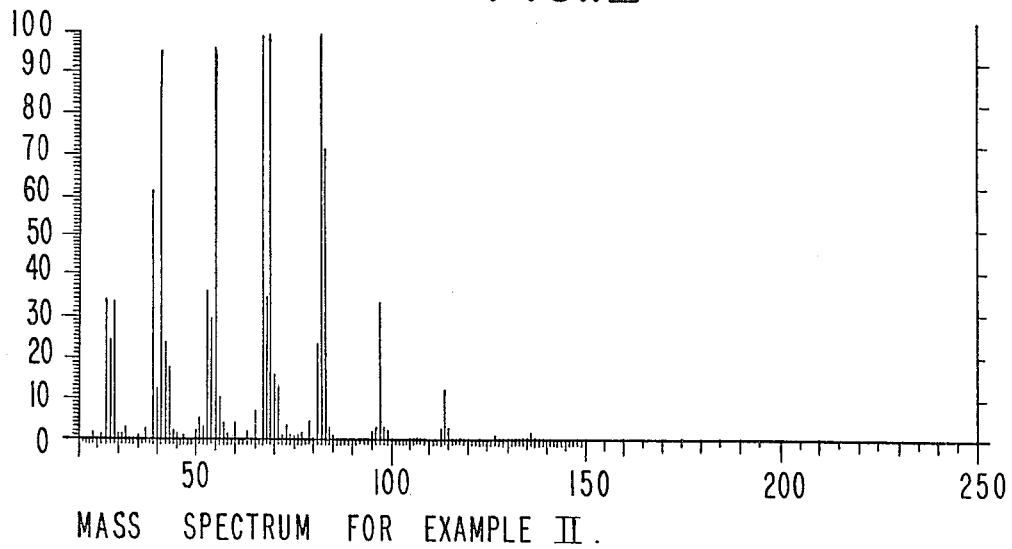
FIG. 12 sets forth the mass spectrum for cis-3-hexenyl-cis-3-hexenoate produced according to Example II.
Figure 13:
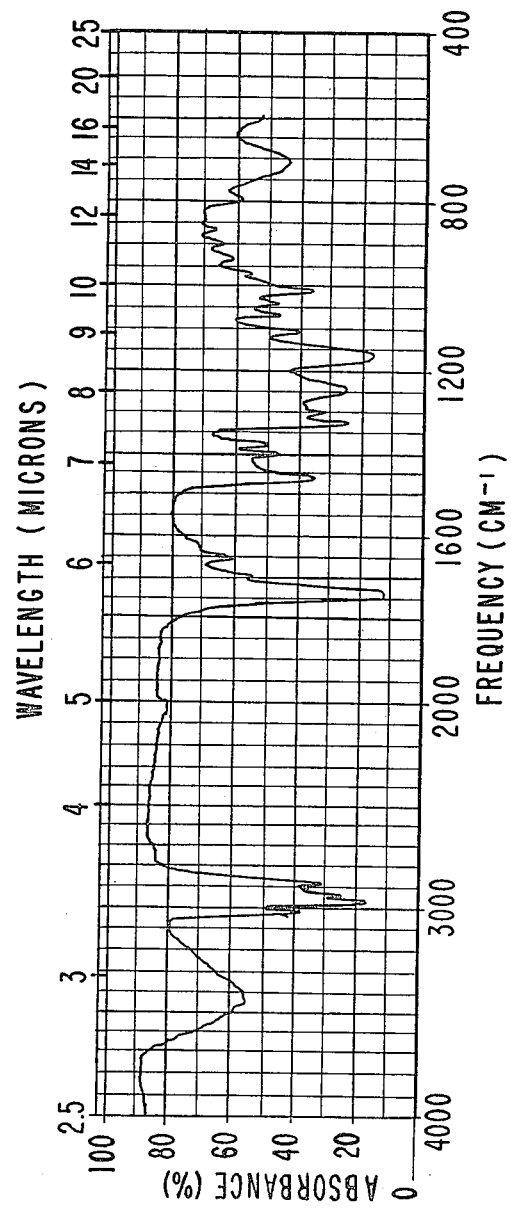
FIG. 13 sets forth the infrared spectrum for cis-3-hexenyl-cis-3-hexenoate produced according to Example II.

FIG. 2 sets forth the GLC profile of the reaction mass. FIG. 3 sets forth the NMR spectrum for the cis-3-hexenol. FIG. 4 sets forth the mass spectrum for the cis-3-hexenol. FIG. 5 sets forth the NMR spectrum for the cis-3-hexenal in the mixture. FIG. 6 sets forth the mass spectrum for the cis-3-hexenal in the mixture. FIG. 7 sets forth the NMR spectrum for the trans-2-hexenal in the mixture. FIG. 8 sets forth the mass spectrum for the trans-2-hexenal in the mixture. FIG. 9 sets forth the NMR spectrum for the cis-3-hexenyl formate in the mixture. FIG. 10 sets forth the mass spectrum for the cis-3-hexenyl formate in the mixture. FIG. 11 sets forth the NMR spectrum for the cis-3-hexenyl-cis-3-hexenoate in the mixture. FIG. 12 sets forth the mass spectrum for the cis-3-hexenyl-cis-3-hexenoate in the mixture. FIG. 13 sets forth the infrared spectrum for the cis-3-hexenyl-cis-3-hexenoate in the mixture.

EXAMPLE III

Preparation Of Cis-3-Hexenyl Methyl Ether 250 ml of Dimethyl formamide and 24 grams (50% in mineral oil, 0.5 moles) of sodium hydride are charged to a one liter reaction flask equipped with mechanical stirrer, heating mantle, thermometer and stoppered addition funnel. Cis-3-hexenol (50 grams, 0.5 moles) is slowly added over a period of 30 minutes to the reaction mass. During the addition the reaction mass exotherms to 40° C. The reaction mass is heated slightly. When the reaction is finished the reaction mass is cooled to room temperature and 78.1 grams (0.55 moles) of iodomethane is added. The reaction mass is then heated slowly to reflux and monitored by GLC. (500 ft.×0.03 in. SF-96 column programmed at 80°-190° C. at 4° C. per minute). When GLC indicates that no more reaction is taking place (that is when the iodomethane is used up) the reaction mass is cooled to room temperature and slowly poured into 500 ml of water.

The reaction product is extracted with anhydrous diethyl ether and the extract is dried over anhydrous sodium sulfate and concentrated using a rotary evaporator. Spectral data confirmed that the resulting product is cis-3-hexenyl methyl ether.

Figure 15:
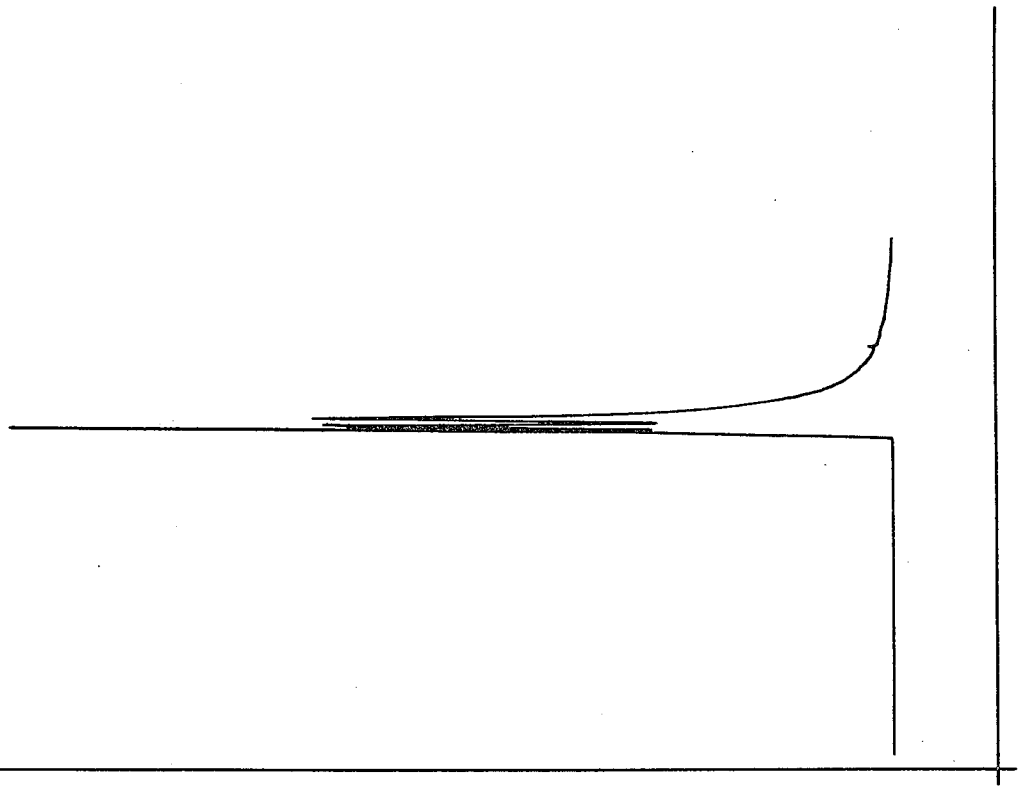
FIG. 15 sets forth the GLC profile for cis-3-hexenylmethylether as trapped out from the 500 ft.×0.03 in. SF-96 column programmed at 80°–190° C. at 4° C. per minute.
Figure 14:
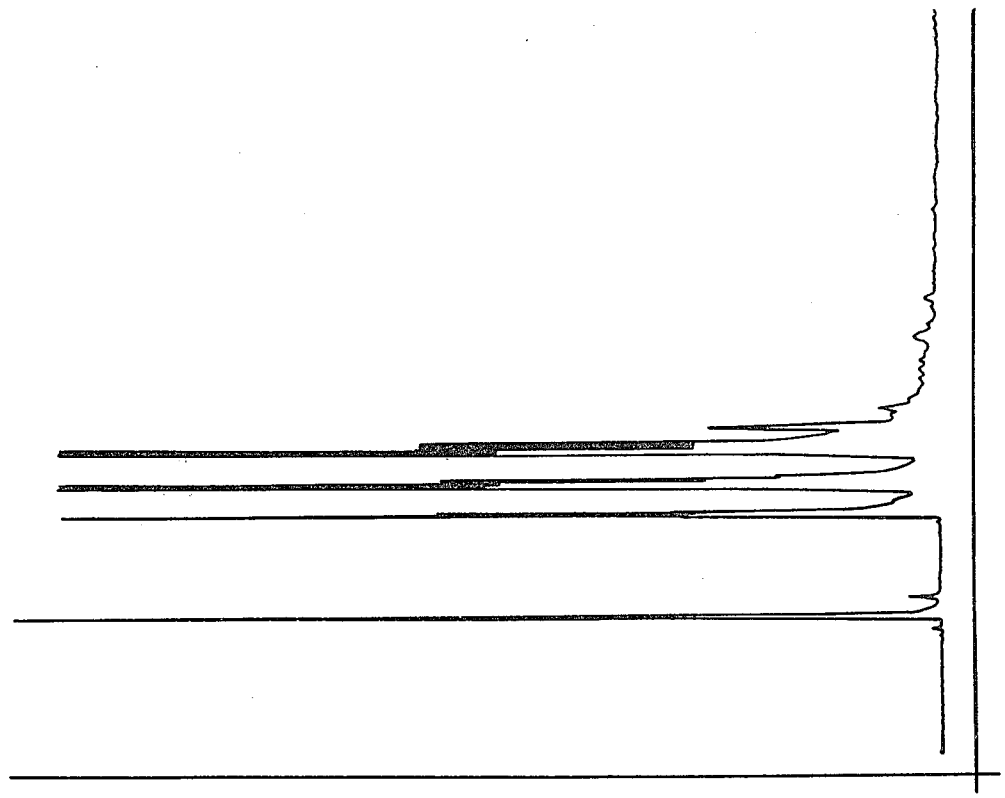
FIG. 14 sets forth the GLC profile for the cis-3-hexenylmethylether produced according to Example III as separated on a GLC column (500 ft.×0.03 in., SF 96 coated column; programmed at 80°–190° C. at 4° C. per minute) after distillation using a rotary evaporator.

FIG. 14 sets forth the GLC profile of the reaction mixture after obtention from the rotary evaporator (conditions: 500 ft.×0.03 in. SF-96 column programmed at 80°-190° C. at 4° C. per minute). FIG. 15 sets forth the GLC profile of the trapped material, the cis-3-hexenyl methyl ether (conditions: 10 ft.×⅛ in. SE 30 column programmed at 70°-190° C. at 10° C. per minute).

EXAMPLE IV

Preparation Of Cis-3-Hexenyl Methyl Ether Using Diethyl Benzene Solvent

Into a 3 liter reaction flask equipped with mechanical stirrer, heating mantle, Claisen adaptor, thermometer, Friedrichs condenser and addition funnel is placed 132 grams of sodium hydride (50% in mineral oil) (2.75 moles) and 1 liter of diethyl benzene. 200 Grams (2 moles) of cis-3-hexenol is then added dropwise over a period of one hour while the reaction mass exotherms to 43° C. The reaction mass is then refluxed at 120° C. for 30 minutes. The reaction mixture bubbles hydrogen off vigorously.

When there appears to be no more gas given off the reaction mass is cooled to room temperature.

312.4 Grams (2.2 moles) of iodomethane is added dropwise over a period of one hour. The reaction mass is then heated over a period of two hours at reflux 120°-145° C. The reaction mass is then cooled to room temperature and added with stirring to two liters of water. The water/reaction mass mixture is then stirred for one hour. The reaction mass is then added to a 4 liter separatory funnel and the organic layer is separated from the aqueous layer. The organic layer is set aside and the aqueous layer is filtered through a Buchner funnel and extracted till odorless with five 300 ml portions of diethyl ether. The diethyl ether is then removed on a rotary evaporator and the extract is added to the organic layer that was set aside. The resulting organic phase is dried over anhydrous sodium sulfate and a GC analysis indicates that 1.43% of cis-3-hexenol remains. The resulting product (867.3 grams) is placed in a 2 liter distillation flask adding 25 grams of triethyl borate and the product rush-over distilled on a 14 inch column at 760 mmHg til the pot temperature reaches 150° C.

The mixture that is left in the pot is transferred to a fractional distillation set up yielding the following fractions:

| Fraction No. | Vapor Temp. | Liquid Temp. | Weight of Fraction |
| --- | --- | --- | --- |
| 1 | 25/33 | 25/81 | |
| 2 | 33 | 83 | |
| 3 | 33 | 82 | 5.2 |
| 4 | 34 | 83 | |
| 5 | 35/39 | 83 | 5.1 |
| 6 | 37 | 83 | 1.7 |
| 7 | 37 | 83 | 5.8 |
| 8 | 37 | 83 | 2.7 |
| 9 | 37 | 84 | 2.2 |
| 10 | 37 | 84 | 4.3 |
| 11 | 37/39 | 85 | 7.3 |
| 12 | 37 | 85 | 7.5 |
| 13 | 36 | 85 | 10.8 |
| 14 | 37 | 85 | 2.3 |
| 15 | 37 | 84 | 5.3 |
| 16 | 37 | 95 | 8.7 |
| 17 | 38 | 105 | 4.6 |
| 18 | 38 | 115 | 3.8 |
| 19 | 25/37 | 125 | 2.8 |
| 20 | 37 | 125 | 5.8 |
| 21 | 37 | 128 | 3.5 |
| 22 | 38 | 128 | 6.2 |
| 23 | 38 | 128 | 3.4 |
| 24 | 38 | 129 | 6.5 |
| 25 | 38 | 130 | 4.3 |
| 26 | 37 | 130 | 4.0 |
| 27 | 35 | 130 | 5.3 |
| 28 | 31 | 130 | Trace |

Fractions 5-27 are bulked and evaluated. Fractions 5-27 bulked have a sweet, green, fruity, pear, green apple-like and fresh fig aroma and taste at the level of 1 ppm.

EXAMPLE V

Grape Flavor Containing Cis-3-Hexenal

The following basic grape flavor formulation is prepared:

| Ingredients | Parts by Weight |
| --- | --- |
| Methylanthranilate | 8 |
| Ethylheptanoate | 1 |
| Diethylmalonate | 4 |
| Ethylbenzoate | 1 |
| Ethylbutyrate | 20 |
| Ethylacetate | 35 |
| Benzylacetate | 1 |
| Benzylalcohol | 5 |
| Propylene glycol | 25 |

This basic grape flavor formulation is divided into two parts, to the first part 0.2% by weight of the composition of matter prepared according to Example II containing cis-3-hexenal is added, to the second part nothing is added. Fresh topnotes are present in the flavor containing the composition of Example II, with a significant increase in the pulpy, skin notes. The total flavor is more natural juice like using the composition of Example II. Therefore, the flavor with the composition of Example II containing the cis-3-hexenal is preferred by all members of a four member bench panel.

EXAMPLE VI

Use Of Cis-3-Hexenyl Methyl Ether In A Basic Oral Hygiene Flavor

The following basic oral hygiene flavor is prepared:

| Ingredients | Parts by Weight |
|---|---|
| Peppermint oil | 89.0 |
| Spearmint oil | 2.0 |
| Clove oil | 1.0 |
| Anethole | 2.0 |
| Cardamon oil | 0.1 |
| Wintergreen oil | 5.0 |
| Cinnamic aldehyde | 0.9 |

This basic oral hygiene flavor is compared in water at the rate of 8 ppm with and without the addition of 2 ppm of cis-3-hexenyl methyl ether prepared according to Example III or Example IV. The ethereal character of cis-3-hexenyl methyl ether prepared according to Example III or IV found in the flavor with the addition of this chemical does not only create the impression of a stronger flavor but a mouth coating effect extends the flavor impact and increases the cooling effect. In addition, the flavor with the cis-3-hexenyl methyl ether is longer lasting. Therefore, the flavor with the cis-3-hexenyl methyl ether is preferred by a bench panel of four members.

EXAMPLE VII

Use of Cis-3-Hexenyl Methyl Ether In a Basic Cherry Formulation

The following basic cherry flavor formulation is prepared:

| Ingredients | Parts by Weight |
|---|---|
| Heliotropine | 10.0 |
| Benzaldehyde | 5.0 |
| Paratoluacetaldehyde | 0.5 |
| Vanillin | 2.0 |
| Ethyl-3-methyl-3-phenyl glycidate | 4.0 |
| Phenylethylacetaldehyde | 0.1 |
| Benzylacetate | 0.2 |
| Maltol | 2.0 |
| Benzylalcohol | 6.2 |
| Propylene glycol | 70.0 |

The basic cherry flavor is compared in water at the rate of 20 ppm with and without the addition of 0.02 ppm of cis-3-hexenyl methyl ether prepared according to Example III or IV. The flavor with the cis-3-hexenyl methyl ether has a more black cherry juice character both in aroma and taste. Therefore, it is preferred by a bench panel as being more natural and more characteristic.

EXAMPLE VIII

Perfume Formulations Containing Cis-3-Hexenal and Cis-3-Hexenyl Methyl Ether

The following basic jasmine formulations are prepared:

| Ingredients | Parts by Weight 8A | Parts by Weight 8B |
|---|---|---|
| Benzyl Acetate | 30.0 | 30.0 |
| Phenyl Ethyl Alcohol | 20.0 | 20.0 |
| Eugenol | 0.2 | 0.2 |
| Geraniol | 2.0 | 2.0 |
| Benzyl Alcohol | 20.2 | 20.2 |
| Linalool | 5.0 | 5.0 |
| Indole-10% in Diethyl phthalate | 0.5 | 0.5 |
| Ylang Ylang Oil | 0.1 | 0.1 |
| Isophytol | 10.0 | 10.0 |
| Jasmine Absolute | 1.0 | 1.0 |
| Amyl Cinnamic Aldehyde | 5.0 | 5.0 |
| Benzyl Propionate | 5.0 | 5.0 |
| Composition containing Cis-3-hexenal produced according to Ex. II | 1.0 | — |
| Cis-3-hexenyl methyl ether produced according to Example III or IV | — | 1.0 |

The intense green, leafy character of the cis-3-hexenal composition produced according to Example II or the cis-3-hexenyl methyl ether produced according to Example III or IV fits well into the jasmine topnote enhancing and making the formulations much more natural like and longer lasting.

EXAMPLE IX

A. POWDER FLAVOR FORMULATION

20 Grams of the flavor composition of Example V is emulsified in a solution containing 300 gm gum acacia and 700 gm water. The emulsion is spray-dried with a Bown Lab Model Drier utilizing 260 c.f.m. of air with an inlet temperature of 500° F., an outlet temperature of 200° F. and a wheel speed of 50,000 rpm.

B. SUSTAINED RELEASE FLAVOR

The following mixture is prepared:

| Ingredients | Parts by Weight |
|---|---|
| Liquid Grape Flavor Composition of Ex. V | 20 |
| Propylene glycol | 9 |
| Cab-O-Sil ® M-5 (Brand of Silica produced by the Cabot Corporation of 125 High St., Boston, Mass. 02110; Physical Properties: Surface Area: 200m²/gm Nominal particle size: 0.012 microns Density: 2.3 lbs/cu.ft. | 5.00 |

The Cab-O-Sil is dispersed in the liquid grape flavor composition of Example V with vigorous stirring, thereby resulting in a viscous liquid. 71 Parts by weight of the powder flavor composition of Part A, supra, is then blended into the said viscous liquid, with stirring, at 25° C. for a period of 30 minutes resulting in a dry, free flowing sustained release flavor powder.

EXAMPLE X

10 Parts by weight of 50 Bloom pigskin gelatin is added to 90 parts by weight of water at a temperature of 150° F. The mixture is agitated until the gelatin is completely dissolved and the solution is cooled to 120° F. 20 Parts by weight of the liquid flavor composition of Example V is added to the solution which is then homogenized to form an emulsion having particle size typically in the range of 2-5 microns. This material is kept at 120° F. under which conditions the gelatin will not jell.

Coacervation is induced by adding slowly and uniformly 40 parts by weight of a 20% aqueous solution of sodium sulphate. During coacervation the gelatin molecules are deposited uniformly about each oil droplet as a nucleus.

Gelatin is effected by pouring the heated coacervate mixture into 1,000 parts by weight of 7% aqueous solution of sodium sulphate at 65° F. The resulting jelled coacervate may be filtered and washed with water at temperatures below the melting point of gelatin, to remove the salt.

Hardening of the filtered cake, in this example, is effected by washing with 200 parts by weight of 37% solution of formaldehyde in water. The cake is then washed to remove residual formaldehyde.

EXAMPLE XI

Chewing Gum

100 Parts by weight of chicle are mixed with 4 parts by weight of the flavor prepared in accordance with Example IX. 300 Parts of sucrose and 100 parts of corn syrup are added. Mixing is effected in a ribbon blender with jacketed side walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant, long lasting grape flavor.

EXAMPLE XII

Chewing Gum

100 Parts by weight of chicle are mixed with 18 parts by weight of the flavor prepared in accordance with Example X. 300 Parts of sucrose and 100 parts of corn syrup are then added. Mixing is effected in a ribbon blender with jacketed side walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant, long lasting grape flavor.

EXAMPLE XIII

A. POWDER FLAVOR FORMULATION

20 Grams of the flavor composition of Example VI is emulsified in a solution containing 300 gm gum acacia and 700 gm water. The emulsion is spray-dried with a Bowen Lab Model Drier utilizing 260 c.f.m. of air with an inlet temperature of 500° F., an outlet temperature of 200° F. and a wheel speed of 50,000 rpm.

B. SUSTAINED RELEASE FLAVOR

The following mixture is prepared:

| Ingredients | Parts by Weight |
| --- | --- |
| Oral Hygiene Flavor Composition of Ex. VI | 20 |
| Propylene gylcol | 9 |
| Cab-O-Sil ® M-5 (Brand of Silica produced by the Cabot Corp. at 125 High Street, Boston, Mass. 02110; Physical Properties: Surface Area: 200 m²/gm Nominal particle size: 0.012 microns Density: 2.3 lbs/cu.ft. | 5.00 |

The Cab-O-Sil is dispersed in the oral hygiene flavor composition of Example VI with vigorous stirring, thereby resulting in a viscous liquid. 71 Parts by weight of the powder flavor composition of Part A, supra, is then blended into the said viscous liquid, with stirring, at 25° C. for a period of 30 minutes resulting in a dry, free flowing sustained release flavor powder.

EXAMPLE XIV

10 Parts by weight of 50 Bloom pigskin gelatin is added to 90 parts by weight of water at a temperature of 150° F. The mixture is agitated until the gelatin is completely dissolved and the solution is cooled to 120° F. 20 Parts by weight of the liquid flavor composition of Example VI is added to the solution which is then homogenized to form an emulsion having particle size typically in the range of 2-5 microns. This material is kept at 120° F. under which conditions the gelatin will not jell.

Coacervation is induced by adding slowly and uniformly 40 parts by weight of a 20% aqueous solution of sodium sulphate. During coacervation the gelatin moleclues are deposited uniformly about each oil droplet as a nucleus.

Gelation is effected by pouring the heated coacervate mixture into 1,000 parts by weight of 7% aqueous solution of sodium sulphate at 65° F. The resulting jelled coacervate may be filtered and washed with water at temperatures below the melting point of gelatin, to remove the salt.

Hardening of the filtered cake, in this example, is effected by washing with 200 parts by weight of 37% solution of formaldehyde in water. The cake is then washed to remove residual formaldehyde.

EXAMPLE XV

Chewing Gum

100 Parts by weight of chicle are mixed with 4 parts by weight of the flavor prepared in accordance with Example XIII. Mixing is effected in a ribbon blender with jacketed side walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant, long lasting oral hygiene flavor.

EXAMPLE XVI

Chewing Gum

100 Parts by weight of chicle are mixed with 18 parts by weight of the flavor prepared in accordance with Example XIV. 300 Parts of sucrose and 100 parts of corn syrup are then added. Mixing is effected in a ribbon blender with jacketed side walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant, long lasting oral hygiene flavor.

EXAMPLE XVII

Toothpaste Formulation

The following separate groups of ingredients are prepared:

| Parts by Weight | Ingredients |
| --- | --- |
| Group "A" | |
| 30.200 | Glycerine |
| 15.325 | Distilled water |
| .100 | Sodium Benzoate |
| .125 | Saccharin Sodium |
| .400 | Stannous Fluoride |
| Group "B" | |
| 12.500 | Calcium Carbonate |
| 37.200 | Dicalcium Phosphate (Dihydrate) |
| Group "C" | |
| 2.000 | Sodium N-Lauroyl Sarcosinate (foaming agent) |
| Group "D" | |
| 1.200 | Flavor material of Example XIII |
| 100.00 Total | |

PROCEDURE:
1. The ingredients in Group "A" are stirred and heated in a stream jacketed kettle to 160° F.
2. Stirring is continued for an additional three to five minutes to form a homogeneous gel.
3. The powders of Group "B" are added to the gel, while mixing, until a homogeneous paste is formed.
4. With stirring, the flavor of "D" is added and lastly the sodium-n-lauroyl sarcosinate.
5. The resultant slurry is then blended for one hour. The completed paste is then transferred to three roller mill and the homogenized, and finally tubed.

The resulting toothpaste when used in a normal toothbrushing procedure yields a pleasant oral hygiene flavor, of constant strong intensity throughout said procedure (1-1.5 minutes).

EXAMPLE XVIII

Chewable Vitamin Tablets

The flavor material produced according to the process of Example XIII is added to a Chewable Vitamin Tablet Formulation at a rate of 10 gm/Kg which Chewable Vitamin Tablet formulation is prepared as follows:

In a Hobart Mixer, the following materials are blended to homogeneity:

| | Gms/1000 Tablets |
| --- | --- |
| Vitamin C (absorbic acid) as ascorbic acid-sodium ascorbate mixture 1:1 | 70.11 |
| Vitamin B$_1$ (thiamine mononitrate) as Rocoat ® thiamine mononitrate 33⅓% (Hoffman La Roche) | 4.0 |
| Vitamin B$_2$ (riboflavin) as Rocoat ® riboflavin 33⅓% | 5.0 |
| Vitamin B$_6$ (pyridoxine hydrochloride) as Rocoat ® pyridoxine hydrochloride 33⅓% | 4.0 |
| Niacinamide as Rocoat ® niacinamide 33⅓% | 33.0 |
| Calcium pantothenate | 11.5 |
| Vitamin B$_{12}$ (cyanocobalamin) as Merck 0.1% in gelatin | 3.5 |
| Vitamin E (dl-alpha tocopheryl acetate) as dry Vitamin E acetate 33⅓% | 6.6 |
| d-Biotin | 0.044 |
| Flavor of Example XIII | (as indicated above) |
| Certified lake color | 5.0 |
| Sweetener - sodium saccharin | 1.0 |
| Magnesium stearate lubricant | 10.0 |
| Mannitol q.s. to make | 500.0 |

Preliminary tablets are prepared by slugging with flat-faced punches and grinding the slugs to 14 mesh. 13.5 Grams dry Vitamin A Acetate and 0.6 grams Vitamin D are then added as beadlets. The entire blend is then compressed using concave punches at 0.5 gm each.

Chewing of the resultant tablets yields a pleasant, long-lasting, consistently strong oral hygiene flavor for a period of 12 minutes.

EXAMPLE XIX

A tobacco blend is made up by mixing the following materials:

| Ingredient | Parts by Weight |
| --- | --- |
| Bright | 40.1 |
| Burley | 24.9 |
| Maryland | 1.1 |
| Turkish | 11.6 |
| Stem (flue cured) | 14.2 |
| Glycerine | 2.8 |
| Water | 5.3 |

The above tobacco is used in producing cigarettes, and the following formulation is compounded and incorporated into each of these cigarettes:

| Ingredient | Parts by Weight |
| --- | --- |
| Ethyl butyrate | .05 |
| Ethyl valerate | .05 |
| Maltol | 2.00 |
| Cocoa extract | 26.00 |
| Coffee extract | 10.00 |
| Ethyl alcohol | 20.00 |
| Water | 41.90 |

The above flavor is incorporated into model "filter" cigarettes at the rate of 0.1%. One-third of these model cigarettes are treated in the tobacco section with the mixture produced according to Example II at 100 ppm per cigarette. Another one-third of these model cigarettes are treated in the filter with cis-3-hexenyl-methyl-ether produced according to Example III at the rate of $2 \times 10^{-5}$ gm. When evaluated by paired comparison, the cigarettes treated both in the tobacco and in the filter with the compositions, respectively, of Example II and Example III are found, in smoke flavor, to be more tobacco-like with sweet, fruity, cooling, green aromas prior to and on smoking in the mainstream and in the sidestream.

EXAMPLE XX

Preparation of a Cosmetic Powder Composition

A cosmetic powder is prepared by mixing in a ball mill, 100 g of talcium powder with 0.25 g of the composition of matter as set forth in the table below. Each of the cosmetic powders prepared with each of the ingredients of the composition of matters set forth in the table below has an aroma as set forth in the table below:

A. Mixture of Example II:
   Powerful green, fruity, fatty, spicy aroma with leaf alcohol nuances and an intense very stable natural green note.

B. Cis-3-Hexenyl-Methyl-Ether produced according to Example III:
   A grassy, green aroma with fruity topnotes and a jasmine-like undertone.

C. Compositions of Example VIII:
   Intense green, leafy aroma with strong jasmine topnote.

EXAMPLE XXI

Perfumed Liquid Detergent

Concentrated liquid detergents (Lysine salt of n-dodecylbenzene sulfonic acid as more specifically described in U.S. Pat. No. 3,948,818, issued on Apr. 6, 1976) with aromas as indicated in the table below are prepared containing 0.10%, 0.15% and 0.20% of the compositions of matter as set forth in the table below. They are prepared and added by homogeneously mixing the appropriate quantity of fragrance compositions as set forth in the table below in the liquid detergent. The detergents all possess excellent aromas as set forth in the table below with greater concentrations of perfume composition:

A. Mixture of Example II:
   Powerful green, fruity, fatty, spicy aroma with leaf alcohol nuances and an intense very stable natural green note.
B. Cis-3-Hexenyl-Methyl-Ether produced according to Example III:
   A grassy, green aroma with fruity topnotes and a jasmine-like undertone.
C. Compositions of Example VIII:
   Intense green, leafy aroma with strong jasmine topnote.

EXAMPLE XXII

Preparation of a Cologne and Handkerchief Perfume

The compositions as set forth in the table below are incorporated into colognes at concentrations of 2.0%, 2.5%, 3.0%, 3.5%, 4.0%, 4.5% and 5.0% and 85%, 90%, and 95% aqueous food grade ethanol; and into handkerchief perfumes at concentrations of 15%, 20%, 25%, 30% and 40% (in 85%, 90% and 95% aqueous food grade ethanol). Distictive aromas as set forth in the table below are imparted to the colognes and to the handkerchief perfumes as all levels indicated above:

A. Mixture of Example II:
   Powerful green, fruity, fatty spicy aroma with leaf alcohol nuances and an intense very stable natural green note.
B. Cis-3-Hexenyl-Methyl-Ether produced according to Example III:
   A grassy, green aroma with fruity topnotes and a jasmine-like undertone.
C. Compositions of Example VIII:
   Intense green, leafy aroma with strong jasmine topnote.

EXAMPLE XXIII

Preparation of Soap Compositions

One hundred grams of soap chips are mixed with one gram of each of the formulations as set forth in the table below until homogeneous compositions are obtained. In each of the cases, the homogeneous compositions are heated under three atmospheres pressure at 180° C. for a period of three hours and the resulting liquids are placed into soap molds. The resulting soap cakes on cooling manifest aromas as set forth below:

A. Mixture of Example II:
   Powerful green, fruity, fatty spicy aroma with leaf alcohol nuances and an intense very stable natural green note.
B. Cis-3-Hexenyl-Methyl-Ether produced according to Example III:
   A grassy, green aroma with fruity topnotes and a jasmine-like undertone.
C. Compositions of Example VIII:
   Intense green, leafy aroma with strong jasmine topnote.

EXAMPLE XXIV

Preparation of a Solid Detergent Composition

A detergent is prepared from the following ingredients according to Example I:

|  | Percent by Weight |
|---|---|
| "Neodol 45-11" (a $C_{14}$-$C_{15}$ alcohol ethoxylated with 11 moles of ethylene oxide) | 12 |
| Sodium carbonate | 55 |
| Sodium citrate | 20 |
| Sodium sulfate, water brighteners | q.s. |

The detergent is a "phosphate-free" detergent. A total of 100 grams of this detergent is admixed with 0.15 grams of each of the materials as set forth in the table below. Each of the detergent samples has excellent aromas as set forth in the table below:

A. Mixture of Example II:
   Powerful green, fruity, fatty spicy aroma with leaf alcohol nuances and an intense very stable natural green note.
B. Cis-3-Hexenyl-Methyl-Ether produced according to Example III:
   A grassy, green aroma with fruity topnotes and a jasmine-like undertone.
C. Compositions of Example VIII:
   Intense green, leafy aroma with strong jasmine topnote.

EXAMPLE XXV

Utilizing the procedure of Example I of column 15 of U.S. Pat. No. 3,632,396, a nonwoven cloth substrate as a dryer-added fabric softening article a manufacture is prepared wherein the substrate, the substrate coating and the outer coating and the perfuming material are as follows:

1. a water "dissolvable" paper (Dissolvo Paper);
2. Adogen 448 (m.p. about 140° F.) as the substrate coating; and
3. an outer coating having the following formulation (m.p. about 150° F.):
   57 percent $C_{20-22}$ HAPS
   22 percent isopropyl alcohol
   20 percent antistatic agent
   1 percent of the composition of matter as set forth in the table below giving rise to the aroma nuances as set forth in the table below:

A. Mixture of Example II:
   Powerful green, fruity, fatty spicy aroma with leaf alcohol nuances and an intense very stable natural green note.
B. Cis-3-Hexenyl-Methyl-Ether produced according to Example III:
   A grassy, green aroma with fruity topnotes and a jasmine-like undertone.
C. Compositions of Example VIII:
   Intense green, leafy aroma with strong jasmine topnote.

A fabric softening composition prepared as set forth above having the above aroma characteristics essentially consists of a substrate having a weight of about 3 grams per 100 square inches, a substrate coating of about 1.85 grams per 100 square inches of substrate and an outer coating of a 1.4 grams per 100 square inches of substrate, thereby providing a total aromatized substrate and outer coating weight ratio of about 1:1 by weight of the substrate. The aroma as set forth above is imparted in a pleasant manner to the head space in the dryer on operation thereof using said dryer added fabric softening nonwoven fabric.

What is claimed is:
1. The composition of matter consisting of:
Cis-3-hexenal from 20% up to 80%;
Trans-2-hexenal from 5% up to 40%;
Cis-3-hexenyl formate from 0% up to 20%;
Cis-3-hexenol from 0% up to 40%;
Cis-3-hexenyl-cis-3-hexenoate from 1% up to 10%;
said percentages being "mole" percentages.

* * * * *